Nov. 25, 1952 N. A. DICKS ET AL 2,618,905
APPARATUS FOR SUPPORTING GLASS SHEETS OR PLATES
Filed Aug. 16, 1949 2 SHEETS—SHEET 1
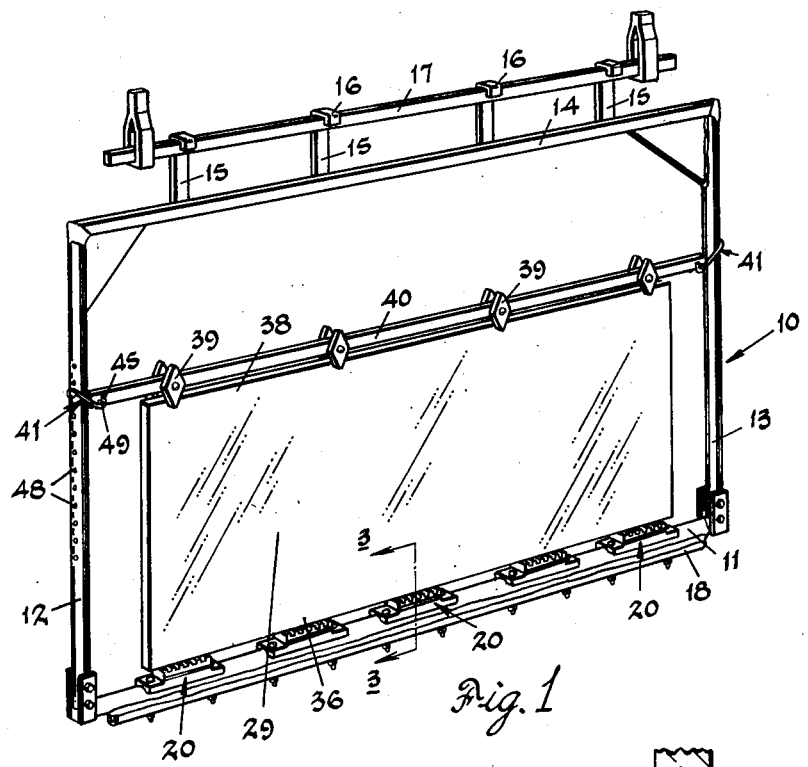
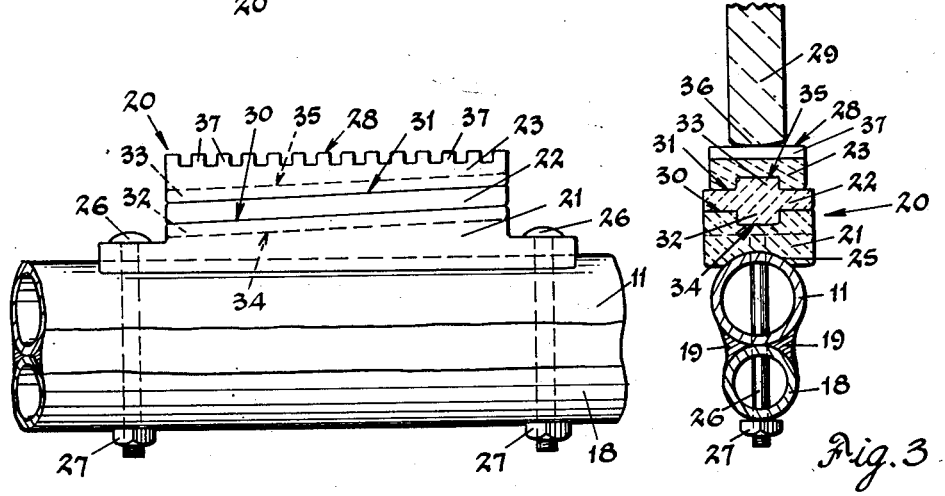
Inventors
Norman A. Dicks and
Benjamin A. Schultz
By Nobbe & Swope
Attorneys Nov. 25, 1952  N. A. DICKS ET AL  2,618,905
APPARATUS FOR SUPPORTING GLASS SHEETS OR PLATES
Filed Aug. 16, 1949  2 SHEETS—SHEET 2

Inventors
Norman A. Dicks and
Benjamin A. Schultz
By Nobbe & Swope
Attorneys

Patented Nov. 25, 1952

2,618,905

UNITED STATES PATENT OFFICE 2,618,905

APPARATUS FOR SUPPORTING GLASS SHEETS OR PLATES

Norman A. Dicks, Toledo, and Benjamin A. Schultz, Rossford, Ohio, assignors to Libbey-Owens-Ford Glass Company, Toledo, Ohio, a corporation of Ohio Application August 16, 1949, Serial No. 110,616

3 Claims. (Cl. 49—45)

This invention relates broadly to apparatus for use in the tempering of glass and more particularly to an improved type of frame means for supporting a glass sheet or plate during the heating and cooling operations.

Briefly stated, the present invention is concerned with the provision of a novel frame structure for carrying one or more glass sheets or plates in such a manner that the use of the tongs or other forms of hanger devices which tend to mar the glass surfaces may be eliminated. When employing the tongs for supporting large and relatively heavy rectangular sheets or plates of glass for tempering, a plurality of tongs positioned relatively closely to one another are usually required to insure suspension of the sheet in a substantially horizontal position with reference to its upper and lower edges and to prevent sagging or warpage thereof. However, as the glass becomes heated to a temperature approximating that of its softening point, the tongs bite into the opposed glass surfaces and leave small though discernible and objectionable impressions. This is particularly true of the relatively large and heavy glass plates which are installed in door openings and the like. Since the glass surfaces cannot be refinished after tempering, whatever impressions are made therein during tempering remain visually apparent in the finished, transparent door unless hidden by metal framing or hardware.

It is an aim of this invention to provide novel and improved frame means primarily adapted for supporting relatively large and heavy sheets or plates of glass to be tempered.

Another object of the invention is the provision of an improved frame structure which will retain the glass sheets securely in place during tempering and with less liability of breakage or cracking than heretofore and with practically no marring of the surfaces thereof.

Another object of the invention is the provision of an improved frame structure for supporting the glass sheet in such a way as to permit expansion and contraction thereof without danger of warpage and which has a minimum amount of surface contact with the glass.

Another object of the invention is the provision of an improved supporting frame which permits the glass sheet to be easily and conveniently placed thereupon and removed therefrom and which is adapted to handle sheets of different sizes.

A further object of the invention is the provision of an improved supporting frame embodying vertically adjustable means for uniformly supporting the bottom edge of the glass sheet at a plurality of spaced points and for maintaining the same in a horizontal plane.

Other objects and advantages of the invention will become more apparent during the course of the following description when taken in connection with the accompanying drawings.

In the drawings, wherein like numerals are employed to designate like parts throughout the same:

Fig. 1 is a perspective view of a supporting frame constructed in accordance with the invention;

Fig. 2 is a side elevation of one of the adjustable supporting members for the glass sheet;

Fig. 3 is a vertical transverse section taken substantially on line 3—3 of Fig. 1;

Figure 4:
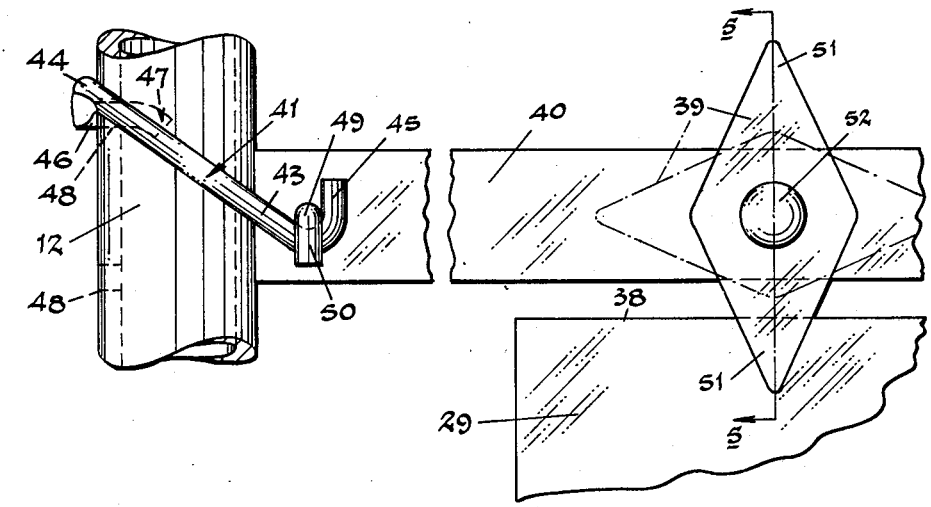
Fig. 4 is an enlarged fragmentary elevation of a portion of the frame structure.
Figure 5:
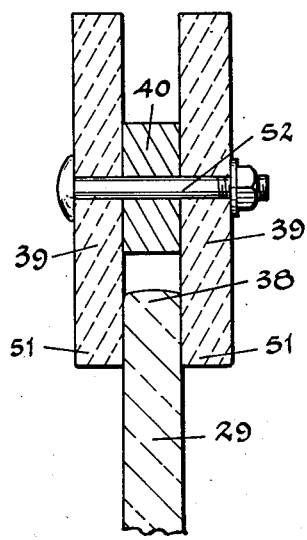
Fig. 5 is a vertical transverse section taken substantially on line 5—5 of Fig. 4.

Referring now to the drawings and particularly to Fig. 1, the improved supporting frame herein provided is generally designated by the numeral 10 and comprises generally a bottom horizontal member 11, vertical side members 12 and 13 and a horizontal top member 14; the bottom, sides and top members being welded or otherwise suitably secured to one another at their adjacent ends. The substantially rectangular frame 10 is carried by vertical hangers 15 suitably secured at their lower ends to the top member 14. The upper ends of these hangers 15 are shaped to form hooks 16 by which the said frame 10 can be suspended from a movable carriage 17 and conveyed thereby during the tempering operations.

The bottom horizontal member 11 is preferably of relatively light tubular cross section to reduce heat absorption and may, if desired, be reinforced by a second tubular member 18 which is welded thereto as indicated at 19 in Fig. 3.

Arranged along the bottom member 11 are a plurality of glass sheet supporting members or blocks 20, each of which is made up of three super-imposed, slidably associated sections 21, 22, and 23. These sections are formed of a suitable refractory material such as, for example, "Marinite" and are associated with one another for relative horizontal sliding movement. The bottom section 21 of the block constitutes the base and has a longitudinally extending arcuate groove 25 formed in its under surface which fits over the tubular member 11. The base section 21 may be secured to said tubular member by bolts 26 which extend through the members 11 and 18 and have nuts 27 threaded upon their lower projecting ends.

The intermediate section 22 and top section 23 of the block 20 are longitudinally slidable with reference to each other and to the base section 21 so that the upper surface 28 of the top section may be adjusted vertically to level the supported glass sheet 29.

As best shown in Fig. 2, the upper surface 30 of the base section 21 is inclined to the horizontal so that sliding movement of the intermediate section 22 upon the bottom section 21 will cause the top section 23 to move upwardly or downwardly according to the direction of movement of said intermediate section. The lower surface 31 of the top section 23 is also inclined to the horizontal and substantially parallel with the upper surface 30 of the bottom section, thereby increasing the vertical adjustability of the block by movement of the top section 23 with respect to the intermediate section 22 or the combined relative movements of the top and intermediate sections with respect to the base section.

The lower and upper surfaces of the intermediate section 22 are also inclined to the horizontal and extend substantially parallel with the upper surface 30 of the bottom section 21 and lower surface 31 of the top section 23. The lower and upper surfaces of the intermediate section 22 are shaped to provide longitudinal tongue portions 32 and 33 respectively which are received in complemental grooves 34 and 35 provided in the upper surface 30 of the base section 21 and lower surface 31 of the top section 23. Thus, it will be apparent that the intermediate and top sections of the block can be lowered by moving them to the left, as viewed in Fig. 2, or elevated upon movement to the right by reason of the sliding of the intermediate section 22 on the inclined surface 30 of the base 21. Similarly, and without transverse displacement, the top section 23 may be moved with respect to the intermediate section 22 to raise or lower the upper surface 28 thereof.

When placing a sheet or plate of glass 29 on the frame 10, the plurality of blocks 20 spaced along the bottom member 11 may thus be adjusted to raise or lower the top sections 23 thereof until the said sheet is uniformly supported and its lower edge 36 located in a substantially horizontal plane, thereby reducing the tendency of the glass to sag or warp as it becomes softened and which would cause distortion of the sheet from its desired rectangular form.

Preferably, the upper supporting surface 28 of the top section 23 of the block is provided with spaced transverse ribs 37 to materially reduce the surface area in contact with the lower edge 36 of the glass sheet.

Figure 6:
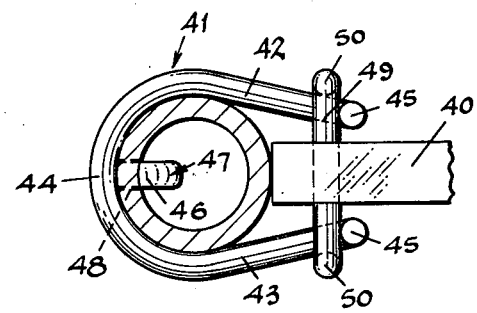
Fig. 6 is a horizontal detail view of a portion of the frame.

The upper marginal portion 38 of the glass sheet 29 is received between a plurality of pairs of retaining elements 39 preferably of a refractory material similar to the blocks 20. These retaining elements are spaced along a horizontal bar 40 which is supported at its opposite ends by the vertical side members 12 and 13 of the frame 10. The bar 40 is adjustably carried by said side members so that it can be moved vertically to accommodate glass sheets of varying width. The bar 40 is carried at its opposite ends by yokes 41 removably associated with the vertical side members 12 and 13. As best shown in Figs. 4 and 6, each yoke 41 is substantially U-shaped and comprises spaced legs 42 and 43 connected by a curved bight portion 44. The free ends of the legs 42 and 43 are bent upwardly to provide hook portions 45. Secured to the bight portion 44 of the yoke is an inwardly extending, substantially horizontal pin 46 having its free end 47 curved downwardly as shown in Fig. 4. The pin 46 is adapted for selective engagement with any one of a plurality of vertically spaced openings 48 in the tubular side member 12 or 13 of the frame. The bar 40 carries horizontally disposed pins 49 extending transversely through its ends; said pins being supported within the hook portions 45 of the yokes 41 and having downwardly bent retaining end portions 50.

In mounting the bar 40 on the frame 10, the curved ends 47 of the pins 46 of yokes 41 are first inserted through the desired openings 48 in the side members 12 and 13 of the frame, after which the yokes are pivotally swung on said pins to the position shown in Fig. 4, where the legs 42 and 43 incline inwardly and downwardly. The opposite ends of the bar 40 are then positioned between the legs of the yokes 41 and the pins 49 supported in the hook portions 45 of said yokes. The yokes thus serve as hangers to freely carry the bar, and as a result it can be easily set in place or removed. Likewise, the yokes can be readily and conveniently adjusted vertically to the desired positions along the vertical side members 12 and 13 of the frame.

The retaining elements 39 are substantially diamond shaped to provide sharply convergent end portions 51. These retaining elements are arranged in pairs, with the elements of each pair rotatably supported at opposite sides of the bar 40 by a bolt 52 passing through said bar. Thus, either element of the pair can be swung 90 degrees to bring its major axis into a horizontal position as indicated in broken lines in Fig. 4 to permit the glass sheet 29 to be located between said elements or removed therefrom. By reason of their shape, the retaining elements 39 will securely hold the upper marginal portion of the glass sheet in place without surface marring of the glass and without materially interfering with the tempering operations.

In practice, the supporting blocks 20 are first adjusted as explained above to bring the upper surfaces 28 of the top sections 23 thereof into horizontal alignment with one another and at the proper height depending upon the width of glass sheet to be supported. The glass sheet 29 is then placed with its lower edge 36 resting on the blocks 20 and the retaining elements 39 on one side of the bar 40 arranged as shown in broken lines in Fig. 4 so that the upper marginal edge 38 of the sheet can be located therebetween, after which the retaining elements are moved to their full line position to hold the sheet in place. In this way, the lower edge of the glass sheet will be uniformly supported by blocks 20 at a plurality of spaced points and maintained thereby in a horizontal plane. The glass sheet is then subjected to the desired tempering operations which usually consist in first heating the sheet within a furnace to approximately the softening point of the glass, after which the frame is removed from the furnace and the sheet subjected to a sudden chilling action by blasts of air.

It is to be understood that the form of the invention herewith shown and described is to be taken as the preferred embodiment of the same,

We claim:

1. In apparatus for supporting glass plates in a vertical position during a tempering operation, a substantially rectangular frame including spaced vertical side members, vertically spaced top and bottom horizontal members secured to said side members, and an intermediate horizontal member vertically adjustable upon the side members and positioned between the top and bottom horizontal members, said intermediate and bottom horizontal members being adapted to receive a glass plate therebetween, a plurality of supporting blocks affixed to the bottom horizontal member for supporting the lower edge of the glass plate, each of said blocks comprising a plurality of superimposed sections slidable horizontally in inclined planes with respect to one another for vertical adjustment relative to the lower edge of the glass plate, the upper section of each of said blocks engaging said lower edge of the glass plate, and means vertically rotatable upon the intermediate horizontal member for rotation into and out of engagement with opposite surfaces of the upper marginal portion of said glass plate to maintain it in a vertical position on said supporting blocks.

2. In apparatus for supporting glass plates in a vertical position during a tempering operation, a substantially rectangular frame including spaced vertical side members, vertically spaced top and bottom horizontal members secured to said side members, and an intermediate horizontal member vertically adjustable upon the side members and positioned between the top and bottom horizontal members, said intermediate and bottom horizontal members being adapted to receive a glass plate therebetween, a plurality of supporting blocks affixed to the bottom horizontal member for supporting the lower edge of the glass plate, each of said blocks comprising a stationary base secured to said bottom horizontal member, an intermediate section slidable horizontally upon said base and a top section engaging the lower edge of the glass sheet and slidable horizontally upon said intermediate section, the upper surface of said base and bottom surface of said top section being inclined to the horizontal and substantially parallel with one another and the upper and lower surfaces of the intermediate section being also inclined to the horizontal and extending substantially parallel with the bottom surface of the top section and upper surface of the base whereby said top section and intermediate section are slidable horizontally in inclined planes relative to the base and also relative to each other to raise or lower said top section into or out of engagement with the lower edge of the glass plate, and means vertically rotatable upon the intermediate horizontal member for rotation into and out of engagement with opposite surfaces of the upper marginal portion of said glass plate to maintain it in a vertical position on the supporting blocks.

3. In apparatus for supporting glass plates in a vertical position during a tempering operation, a substantially rectangular frame including spaced vertical side members, vertically spaced top and bottom horizontal members secured to said side members, and an intermediate horizontal member vertically spaced between said top and bottom horizontal members, said intermediate and bottom horizontal members being adapted to receive a glass sheet therebetween, means associated with the vertical side members and intermediate horizontal member for effecting vertical adjustment of said latter member, a plurality of supporting blocks affixed to the bottom horizontal member for supporting the lower edge of the glass plate and for maintaining the same in a horizontal plane, each of said blocks having an elongated notched upper sheet supporting surface, and a plurality of pairs of retaining elements carried by the intermediate horizontal member for maintaining the glass plate in a vertical position on said supporting blocks, the retaining elements of each pair being positioned at opposite sides of the intermediate horizontal member and independently vertically rotatable into and out of engagement with the glass plate to permit placement of said glass plate upon said supporting blocks and its removal therefrom.

NORMAN A. DICKS.
BENJAMIN A. SCHULTZ.

REFERENCES CITED

The following references are of record in the file of this patent:

UNITED STATES PATENTS

| Number | Name | Date |
| --- | --- | --- |
| 2,009,431 | Black | July 30, 1935 |
| 2,019,595 | Black | Nov. 5, 1935 |
| 2,062,567 | Forbes | Dec. 1, 1936 |
| 2,239,535 | Minton et al. | Apr. 22, 1941 |
| 2,343,490 | White | Mar. 7, 1944 |
| 2,379,213 | Black | June 26, 1945 |
| 2,379,244 | Minton | June 26, 1945 |
| 2,388,809 | White et al. | Nov. 13, 1945 |